United States Patent
Kane et al.

(10) Patent No.: US 10,789,973 B2
(45) Date of Patent: Sep. 29, 2020

(54) MANAGEMENT OF AUTONOMOUS VEHICLE DRIVING FEATURES BASED ON DRIVER STATE

(71) Applicant: Honda Motor Co., Ltd., Tokyo (JP)

(72) Inventors: Adrian Peters Kane, Sunnyvale, CA (US); Robert Wesley Murrish, Santa Clara, CA (US); Shuhei Kinoshita, Sunnyvale, CA (US); Wonravee Chavalit, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/114,761

(22) Filed: Aug. 28, 2018

(65) Prior Publication Data

US 2020/0075043 A1 Mar. 5, 2020

(51) Int. Cl.
*G10L 25/84* (2013.01)
*G10L 25/51* (2013.01)
*B60W 40/08* (2012.01)
*B60W 50/00* (2006.01)
*B60K 28/06* (2006.01)

(52) U.S. Cl.
CPC ............ *G10L 25/84* (2013.01); *B60K 28/063* (2013.01); *B60W 40/08* (2013.01); *B60W 50/0098* (2013.01); *G10L 25/51* (2013.01); *B60W 2040/089* (2013.01); *B60W 2040/0836* (2013.01); *B60W 2540/24* (2013.01); *B60W 2556/50* (2020.02)

(58) Field of Classification Search
CPC combination set(s) only.
See application file for complete search history.

(56) References Cited

U.S. PATENT DOCUMENTS

| | | | |
|---|---|---|---|
| 7,468,673 B2 | 12/2008 | Sultan et al. | |
| 7,962,342 B1 * | 6/2011 | Coughlan | G10L 15/22 379/201.01 |
| 9,210,547 B2 | 12/2015 | Tuukkanen et al. | |
| 9,250,228 B2 | 2/2016 | Nothacker et al. | |
| 9,672,823 B2 | 6/2017 | Penilla et al. | |
| 2007/0219875 A1 * | 9/2007 | Toulotte | G06Q 10/109 705/26.7 |
| 2007/0296601 A1 * | 12/2007 | Sultan | A61B 5/18 340/576 |
| 2010/0010689 A1 | 1/2010 | Yasushi et al. | |
| 2012/0112879 A1 | 5/2012 | Ekchian et al. | |

(Continued)

*Primary Examiner* — Stephen R Burgdorf
(74) *Attorney, Agent, or Firm* — Rankin, Hill & Clark LLP

(57) ABSTRACT

According to one aspect, driver management is provided. One or more speech segments of a driver of an autonomous vehicle may be recorded. A position, a destination, or a previous destination of a driver or an autonomous vehicle may be tracked. An estimated state of the driver may be determined based on one or more of the speech segments, the position, the destination, or the previous destination, and a calendar event associated with the driver or a passenger of the autonomous vehicle. Autonomous driving features may be automatically enabled, disabled, or operation of the autonomous vehicle may be enabled or disabled in different modes based on the estimated state of the driver. Additionally, notifications may be displayed, rideshare applications may be launched, or warnings may be sent based on the estimated state of the driver.

12 Claims, 5 Drawing Sheets

(56) References Cited

U.S. PATENT DOCUMENTS

| | | |
|---|---|---|
| 2014/0231166 A1 | 8/2014 | Miller et al. |
| 2016/0224240 A1* | 8/2016 | Foerster .............. G06F 3/04883 |
| 2016/0318521 A1* | 11/2016 | Nothacker ............ B60W 40/08 |
| 2016/0339922 A1* | 11/2016 | Schmidt ................ B60W 40/08 |
| 2017/0096145 A1 | 4/2017 | Bahn |
| 2017/0344854 A1* | 11/2017 | Behringer .............. G06N 20/00 |
| 2017/0357912 A1* | 12/2017 | Hindi ..................... G06N 20/00 |
| 2018/0266834 A1* | 9/2018 | Cronin ............. G08G 1/096827 |
| 2019/0041228 A1* | 2/2019 | Singhal ................ G05D 1/0088 |
| 2019/0202464 A1* | 7/2019 | McGill ............. G06K 9/00845 |
| 2019/0212158 A1* | 7/2019 | Gordon ............. G01C 21/3415 |
| 2019/0332106 A1* | 10/2019 | Belloni Mourao .. G05D 1/0061 |

* cited by examiner

MANAGEMENT OF AUTONOMOUS VEHICLE DRIVING FEATURES BASED ON DRIVER STATE

BACKGROUND

Generally, vehicles may be equipped with hardware, such as breathalyzers, which may be used to determine whether a driver is intoxicated. Additionally, the breathalyzer hardware may be awkward to use within the vehicle. One approach is an ignition lock system based on a breathalyzer test result. That is, in the breathalyzer ignition lock system, a driver must pass the breathalyzer test in order to start the vehicle. However, breathalyzer hardware may be expensive and/or bulky to install.

BRIEF DESCRIPTION

According to one aspect, a system for driver management may include a microphone, a global positioning system (GPS), a state determiner, and a controller. The microphone may record a first speech segment of a driver of an autonomous vehicle at a first time and a second speech segment of the driver of the autonomous vehicle at a second time. The GPS may track a position or a destination associated with the driver of the autonomous vehicle. The state determiner may determine an estimated state of the driver based on the first speech segment, the second speech segment, the position, or the destination associated with the driver of the autonomous vehicle, and a calendar event associated with the driver of the autonomous vehicle. The controller may enable an autonomous driving feature of the autonomous vehicle based on the estimated state of the driver.

The state determiner may compare the first speech segment to the second speech segment by analyzing a difference in a volume, a cadence, a clarity, or a tone from the first speech segment to the second speech segment and determine the estimated state of the driver based on the comparison. The GPS may determine whether the position or the destination associated with the driver of the autonomous vehicle is an establishment which serves alcohol and the state determiner may determine the estimated state of the driver based on whether the establishment serves alcohol. The state determiner may determine the estimated state of the driver based on whether the establishment serves alcohol and a description of the calendar event. The state determiner may determine the estimated state of the driver based on whether the establishment serves alcohol and a nature of the calendar event. The state determiner may determine the estimated state of the driver based on a nature of the calendar event or a description of the calendar event.

The controller may automatically enable autonomous driving based on the estimated state of the driver being intoxicated. The system may include a transmitter transmitting a warning signal to a mobile device based on the estimated state of the driver. The system may include a transmitter transmitting a rideshare signal to a mobile device associated with launching a rideshare application based on the estimated state of the driver. The system may include a display displaying a warning notification based on the estimated state of the driver.

According to one aspect, a method for driver management may include receiving a first speech segment of a driver of an autonomous vehicle at a first time and a second speech segment of the driver of the autonomous vehicle at a second time, tracking a prior destination associated with the driver of the autonomous vehicle, determining an estimated state of the driver based on the first speech segment, the second speech segment, the prior destination associated with the driver of the autonomous vehicle, and a calendar event associated with the driver of the autonomous vehicle, and controlling operation of the autonomous vehicle based on the estimated state of the driver.

The method may include determining the estimated state of the driver based on a nature of the calendar event or a description of the calendar event. The method may include determining whether the prior destination is an establishment which serves alcohol and determining the estimated state of the driver based on whether the establishment serves alcohol. The controlling the operation of the autonomous vehicle may include enabling or disabling operation of the autonomous vehicle in a manual operation mode.

According to one aspect, a system for driver management may include a microphone, a global positioning system (GPS), a state determiner, and a controller. The microphone may record a speech segment of a driver of an autonomous vehicle. The GPS may track a prior destination associated with the autonomous vehicle. The state determiner may determine an estimated state of the driver based on the speech segment, the prior destination associated with the autonomous vehicle, and a calendar event associated with the passenger of the autonomous vehicle. The controller may control operation of the autonomous vehicle based on the estimated state of the driver.

The state determiner may compare the speech segment to baseline speech segment information by analyzing a difference in a volume, a cadence, a clarity, or a tone from the speech segment to the baseline speech segment information and determine the estimated state of the driver based on the comparison. The GPS may determine whether the prior destination associated with the autonomous vehicle is an establishment which serves alcohol and the state determiner may determine the estimated state of the driver based on whether the establishment serves alcohol. The state determiner may determine the estimated state of the driver based on whether the establishment serves alcohol and a description of the calendar event. The state determiner may determine the estimated state of the driver based on whether the establishment serves alcohol and a nature of the calendar event. The state determiner may determine the estimated state of the driver based on a nature of the calendar event or a description of the calendar event.

DETAILED DESCRIPTION

Figure 1:
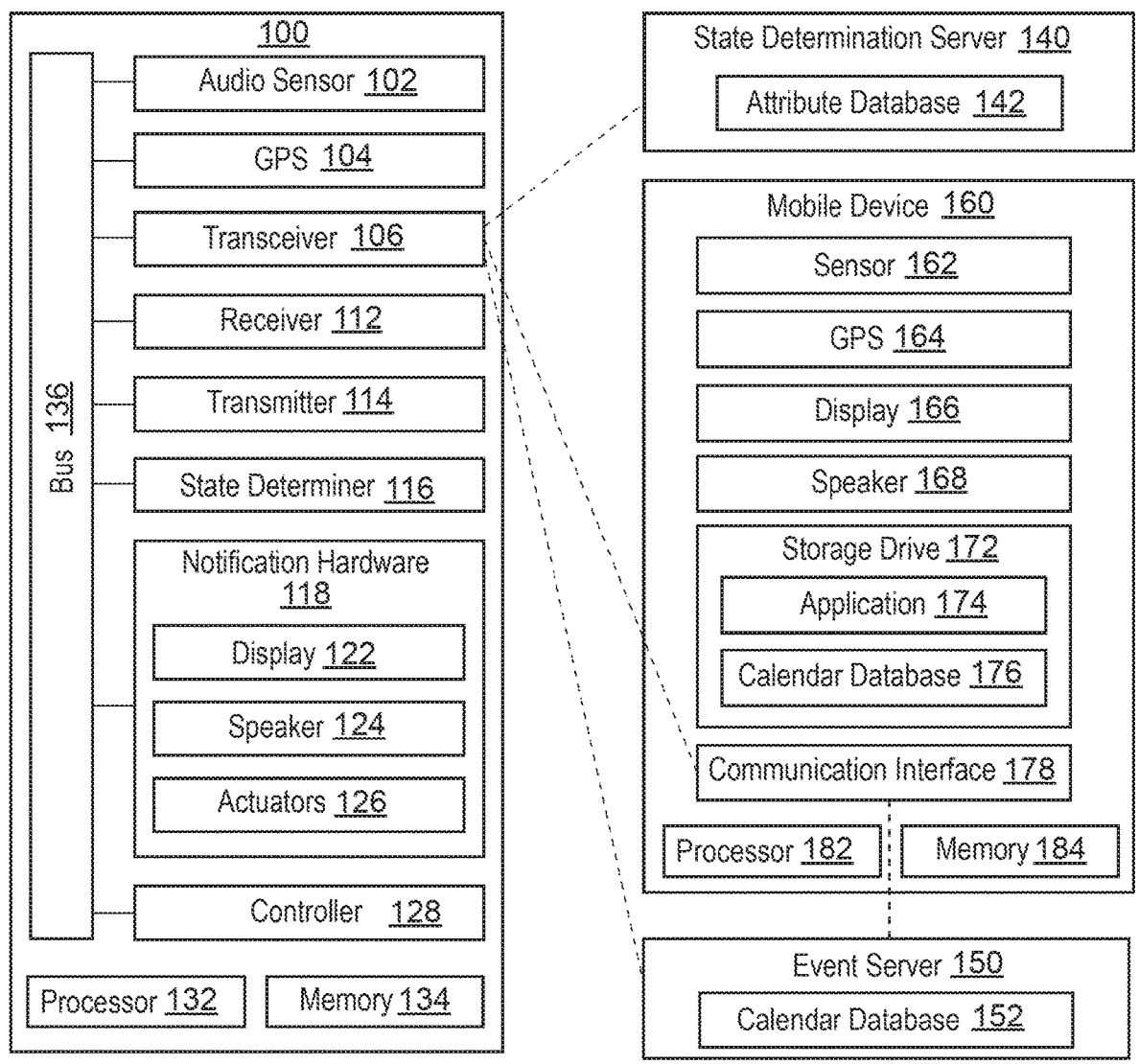
FIG. 1 is a component diagram of a system for driver management, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is a component diagram of a system 100 for driver management, according to one aspect. The system 100 for driver management may include an audio sensor 102, a global positioning system (GPS 104), a transceiver 106 including a receiver 112 and a transmitter 114, a state determiner 116, notification hardware 118 (e.g., including a display 122, a speaker 124, actuators 126), a controller 128, a processor 132, a memory 134, which may be a storage drive. The system 100 may include a bus 136 interconnecting one or more of the aforementioned components and enabling computer communication or communication therebetween. According to one aspect, the system 100 for driver management may be implemented on a vehicle. According to one aspect, the system for driver management may be implemented on a mobile device 160. Similarly to the vehicle, the mobile device 160 may include components such as a sensor 162, a GPS 164, a display 166, a speaker 168, a storage drive 172 which may be used to store one or more applications 174 and/or a calendar database 176, a communication interface 178, a processor 182, and a memory 184. Additionally, either system 100 or 160 for driver management (i.e., the system 100 for driver management implemented on the vehicle or the system implemented on the mobile device 160) may be operably connected to one another or to other computer components, such as a state determination server 140 including an attribute database 142 or an event server 150 including a calendar database 152.

Generally, the system 100 for driver management may receive one or more inputs from the audio sensor 102, the GPS 104, and the transmitter 114 of the transceiver 106 and generate one or more outputs. Examples of inputs from the audio sensor 102 may include speech segments from the audio sensor 102, locations tracked by the GPS 104, or external information such as attribute information from the state determination server 140, calendar event information from the event server 150 or calendar event information from the storage drive 172 of the mobile device 160, as will be described in greater detail herein. Examples of outputs may include control signals for the controller 128 which enable or disable vehicle systems or autonomous driving features of the vehicle, as will be described in greater detail herein. Other examples of outputs may include warning signals for outputting warnings using the vehicle notification hardware 118 or hardware associated with the mobile device 160 or application launching signals for automatically launching an application 174 on the mobile device 160, as will be described in greater detail herein.

The system 100 for driver management may record one or more speech segments of a driver of a vehicle or autonomous vehicle at one or more times. For example, the audio sensor 102 may be a microphone which records a first speech segment of the driver of the autonomous vehicle at a first time and a second speech segment of the driver of the autonomous vehicle at a second time which is different than or after the first time. In this way, the state determiner 116 may derive an estimated state of the driver by comparing the first speech segment to the second speech segment. In other words, the state determiner 116 may determine the estimated state of the driver in a before/after manner by comparing the speech segments of the driver to determine a change in the speech attributes of the driver.

Specifically, the state determiner 116 may analyze or determine a difference in speech attributes, such as a volume, a cadence, a clarity, or a tone based on differences between the first speech segment and the second speech segment. In this way, the state determiner 116 may determine the estimated state of the driver based on the comparison between the first speech segment and the second speech segment. According to one aspect, the state determiner 116 may be implemented via the processor 132 and/or the memory 134 of the vehicle. According to another aspect, the state determiner 116 (e.g., and other components of the system 100) may be implemented via the processor 182 and/or the memory 184 of the mobile device 160.

The first speech segment associated with the first time and the second speech segment associated with the second time may be comparisons taken in the short term or in the long term. For example, if the driver consumes several alcoholic beverages, the speech attributes may change in a relatively short amount of time (e.g., an hour or two). Other changes, such as changes in the first speech segment associated with the first time and the second speech segment associated with the second time may occur over days, months, weeks, or even years, and this type of long term comparison may be used to determine possible health issues with the driver, which may be determined using information from the attribute database 142 indicative of what a change in cadence, clarity, or tone may mean over time, and with reference to different medical diagnoses. Therefore, the state determiner 116 may determine the estimated state of the driver to be associated with a medical condition.

According to one aspect, the sensor 162 of the mobile device 160 may be a microphone which captures one or more of the speech segments and the state determiner 116 may be implemented as an application 174 or a module on the mobile device 160 which, implemented by the processor 182 and/or memory 184 on the mobile device 160, performs the determination of the estimated state of the driver. The state of the driver may be utilized directly by the mobile device 160 or transmitted to the system 100, as implemented on the vehicle and used by the controller 128 to adjust vehicle systems. Further, according to other aspects, the audio sensor 102 of the vehicle may receive one or more of the speech segments and the transmitter 114 of the transceiver 106 may transmit respective speech segments to the mobile device 160 for state determination. Conversely, the sensor 162 of the mobile device 160 may receive one or more of the speech segments and the communication interface 178 of the mobile device 160 may transmit respective speech segments to the system 100 for driver management, as implemented on the vehicle.

The transceiver 106 may receive baseline speech segment information from the attribute database 142 of the state determination server 140. For example, the attribute database 142 may contain attribute data or baseline speech segment information which is indicative of baseline speech attributes. In other words, the attribute database 142 may provide baseline data for speech attributes, such as a volume, a cadence, a clarity, or a tone. Additionally, the attribute database 142 may also be indicative of what deviations from the baseline speech attributes mean (e.g., slurred speech in the short term may be intoxication while slurred speech which develops across months may be an indication of Alzheimer's). In this way, the state determiner 116 may analyze or determine a difference in speech attributes based on differences between the speech segment and the baseline speech segment information or otherwise determine the estimated state of the driver based on a comparison between the speech segment and the baseline speech segment information.

The GPS 104 may track or determine a position, a destination, a route, or a set of waypoints associated with the vehicle, the driver of the vehicle, or a passenger of the vehicle. For example, the GPS 104 may be part of a navigation unit of the vehicle, which may track the position, the route, or the destination of the vehicle. According to one aspect, the GPS 164 of the mobile device 160 may transmit the position, the destination, the route, or waypoint information associated with a user of the mobile device 160 (i.e., the passenger, the occupant, or the driver of the vehicle) via the communication interface 178 to the receiver 112 of the transceiver 106 of the vehicle, which may store this information to the memory 134 or the storage drive. The GPS 104 or the GPS 164 of the mobile device 160 may provide metadata or information associated with a position or a destination associated with the driver, the passenger, or the vehicle. For example, if the vehicle makes a stop at a restaurant, this stop may be noted. Additionally, other metadata may be provided, such as whether the restaurant or establishment serves alcohol or hours during which alcohol is served. In other words, the GPS 104 may determine whether the position (also including prior positions or prior destinations) or the destination associated with the driver, the passenger, or the autonomous vehicle is an establishment which serves alcohol and the state determiner 116 may determine the estimated state of the driver based on whether the establishment serves alcohol. This metadata or information, along with other factors, may be considered by the state determiner 116 to estimate the estimated state of the driver.

Examples of other factors may include the time of day or day of the week, operating hours of the establishment, hours during which alcohol are served at the establishment, speech segments (e.g., "Lets meet at the bar"), among others. For example, if the time of day is 9:00 AM, during which time the establishment does not serve alcohol, the state determiner 116 may determine that the driver is likely not intoxicated as the estimated state of the driver. As another example, if the day of the week is Monday (e.g., which is a work night) the state determiner 116 may take this into consideration when estimating the estimated state of the driver. Calendar information from the calendar database 152 of the event server 150 may be used to supplement this determination. In other words, the state determiner 116 may check to see if the driver is on vacation. If the driver is on vacation, the time of day or day of the week may not be weighed as heavily in determining the estimated state of the driver. Further, the calendar information may be utilized by the state determiner 116 to determine which days of the week are "work nights". For example, if the driver is a nurse, working 12 hour shifts, Monday through Friday may not necessarily be the driver's "work nights". The nurse may, for example, work Wednesday through Sunday, and thus, be more likely to consume alcohol on Monday and Tuesday, rather than on Friday and Saturday. State determination may thus be performed accordingly.

According to one aspect, the state determiner 116 may receive the calendar event information or calendar event metadata from the calendar database 152 of the event server 150 via the receiver 112 of the transceiver 106. According to another aspect, the state determiner 116 may receive the calendar event information or calendar event metadata from the mobile device 160, such as when the calendar information or calendar events are stored locally on the storage drive 172 of the mobile device 160, rather than in the cloud, on the event server 150. Examples of calendar event information or calendar event metadata may include a description of the calendar event, a nature of the calendar event, other attendees attending the calendar event, age of the attendees, among other things. For example, the state determiner 116 may determine the estimated state of the driver based on the description of the calendar event being "guys night out", "girls night out", "21$^{st}$ birthday party", and so forth. In other words, the state determiner 116 may determine the context of the event and infer whether or not alcohol is or will be served and/or whether the driver will consume alcohol at the calendar event.

Further, the state determiner 116 may determine a context associated with the calendar event. The phrase "night out" may not necessarily be construed by the state determiner 116 as a calendar event where alcohol will be consumed. For example, "night out at the art museum" may not result in the state determiner 116 determining the estimated state of the driver to be intoxicated. Similarly, "birthday party" may or may not be indicative of alcohol. For example, "Todd's Birthday Party" from the calendar may result in the state determiner 116 determining the estimated state of the driver as intoxicated based on the first speech segment, the second speech segment, the position or the destination associated with the driver of the autonomous vehicle being at establishments which serve alcohol, the calendar event, and/or metadata associated with Todd. In other words, if the state determiner 116 receives metadata (e.g., from the event server 150 or from the receiver 112 via the internet, a social media application, etc.) that Todd is a one month old infant, the state determiner 116 may not determine the estimated state of the driver to be intoxicated even if the GPS 104 indicates that the vehicle is at an establishment which serves alcohol. However, if the state determiner 116 receives metadata that Todd is celebrating his 21$^{st}$ birthday party, the state determiner 116 may determine the estimated state of the driver to be intoxicated when the GPS 104 confirms that the vehicle is at an establishment which serves alcohol.

In this way, the state determiner 116 may determine the estimated state of the driver based on one or more speech segments, the position or the destination associated with the driver of the autonomous vehicle, the calendar event or associated metadata, whether an establishment at the position, destination, or along the route serves alcohol, a description of the calendar event, a nature of the calendar event, a context associated with the calendar event. Further, the state determiner 116 may determine a degree of confidence associated with the estimated state of the driver based on the one or more speech segments, the position or the destination associated with the driver of the autonomous vehicle, the calendar event or associated metadata, whether an establishment at the position, destination, or along the route serves alcohol, a description of the calendar event, a nature of the calendar event, a context associated with the calendar event, or other historical data, such as whether the driver has consumed alcohol at similar events in the past.

The system 100 for driver management may include a controller 128 controlling various aspects of operation of the vehicle or autonomous vehicle and in response to the determined estimated state of the driver (e.g., intoxicated or not intoxicated). For example, the controller 128 may enable or disable operation of the vehicle or autonomous vehicle (e.g., entirely) if the estimated state of the driver is determined to be intoxicated and above a threshold degree of confidence. As another example, the controller 128 may enable or disable features of the vehicle, such as enabling an autonomous driving feature of the autonomous vehicle based on the estimated state of the driver. In other words, the controller 128 of the system 100 for driver management may automatically have the vehicle enter an autonomous driving mode or suggest or prompt the driver to enter autonomous driving mode or an assisted driving mode using the notification hardware 118, discussed below. According to one aspect, the controller 128 may control operation of the autonomous vehicle based on the estimated state of the driver, such as, for example, only enabling operation of the autonomous vehicle in autonomous mode based on the determination that the estimated state of the driver is intoxicated and/or when this determination is above a threshold degree of confidence. Stated another way, the controller 128 may control operation of the autonomous vehicle by enabling or disabling operation of the autonomous vehicle in a manual operation mode based on the estimated state of the driver.

The system 100 for driver management may include notification hardware 118, such as the display 122, speakers 124, and/or tactile actuators 126, among others which may be used to provide notifications to the driver or passengers of the autonomous vehicle based on the estimated state of the driver. For example, the notification hardware 118 may include the display 122 displaying a warning notification based on the estimated state of the driver (e.g., it is believed that the driver is intoxicated or perhaps that the driver appears to be developing a medical condition, and that a checkup is recommended). As another example, the notification hardware 118 may include speakers 124 which emit a warning notification message or sound based on the estimated state of the driver. The tactile actuators 126 may vibrate a steering wheel or a seat of the vehicle (or other vehicle components) to alert the occupants as to the estimated state of the driver. Additionally, the notification hardware 118 may provide an indication to the driver or occupants when vehicle systems are being modified or automatically activated based on the estimated state of the driver (e.g., notifications displayed, audio warnings provided, etc.), as will be seen in FIG. 2.

As another example, the transmitter 114 of the transceiver 106 may transmit a warning signal to the mobile device 160 based on the estimated state of the driver. The mobile device 160, upon receiving this warning signal via the communication interface 178, may display the warning or provide an audio notification or tactile notification using the hardware of the mobile device 160 (e.g., the display 166 of the mobile device 160 or the speakers 168 of the mobile device 160). Further, the system 100 for driver management may automatically call a cab, taxi, or a rideshare service for the driver and/or other passengers of the vehicle based on the estimated state of the driver. For example, the transmitter 114 may transmit a rideshare signal to the mobile device 160 based on the estimated state of the driver and the rideshare signal may be associated with launching a rideshare application 174. In other words, if the state determiner 116 determines that the driver is intoxicated and that determination is above the threshold confidence level, the system 100 for driver management may transmit the rideshare signal to the mobile device 160 of the driver which autolaunches the rideshare application or 'app', thereby calling a rideshare service or a taxi service to come pick up the driver at his or her current location (e.g., using the GPS 164 of the mobile device 160 or the GPS 104 of the system 100 for driver management).

In this way, the system 100 for driver management may track a user's speech patterns over time and identify long-term health issues or short-term diminished states of the user. This information may be combined with other available information to make the identification or determination of the user or driver's estimated state. As previously discussed, this may mean tracking parameters of the user's speech over time, such as volume, cadence, clarity, or tone. As these factors or parameters change or vary over a longer period of time, these changes may be compared with known medical conditions using the attribute database 142, thereby enabling the state determiner 116 to diagnose potential issues and have the notification hardware 118 or mobile device 160 alert the user to seek medical review.

Regarding short-term effects or changes in the user's speech, the system 100 may detect large changes, greater than a threshold amount defined in the attribute database 142 in the user's speech patterns and combine that with other information, such as the user's calendar information or visited locations. As previously discussed, the system 100 may receive a "Drink out" event from the user's calendar, combined with a confirmed visit to a frequented tavern which serves alcoholic drinks, and combined with a detected change in speech which is slurred in a small time frame (e.g., less than two hours) to determine that the user may be intoxicated as an estimated state of the user. The system 100 may, in response to this estimated state, suggest or prompt the user to engage autonomous driving to travel to the next destination.

Figure 2:
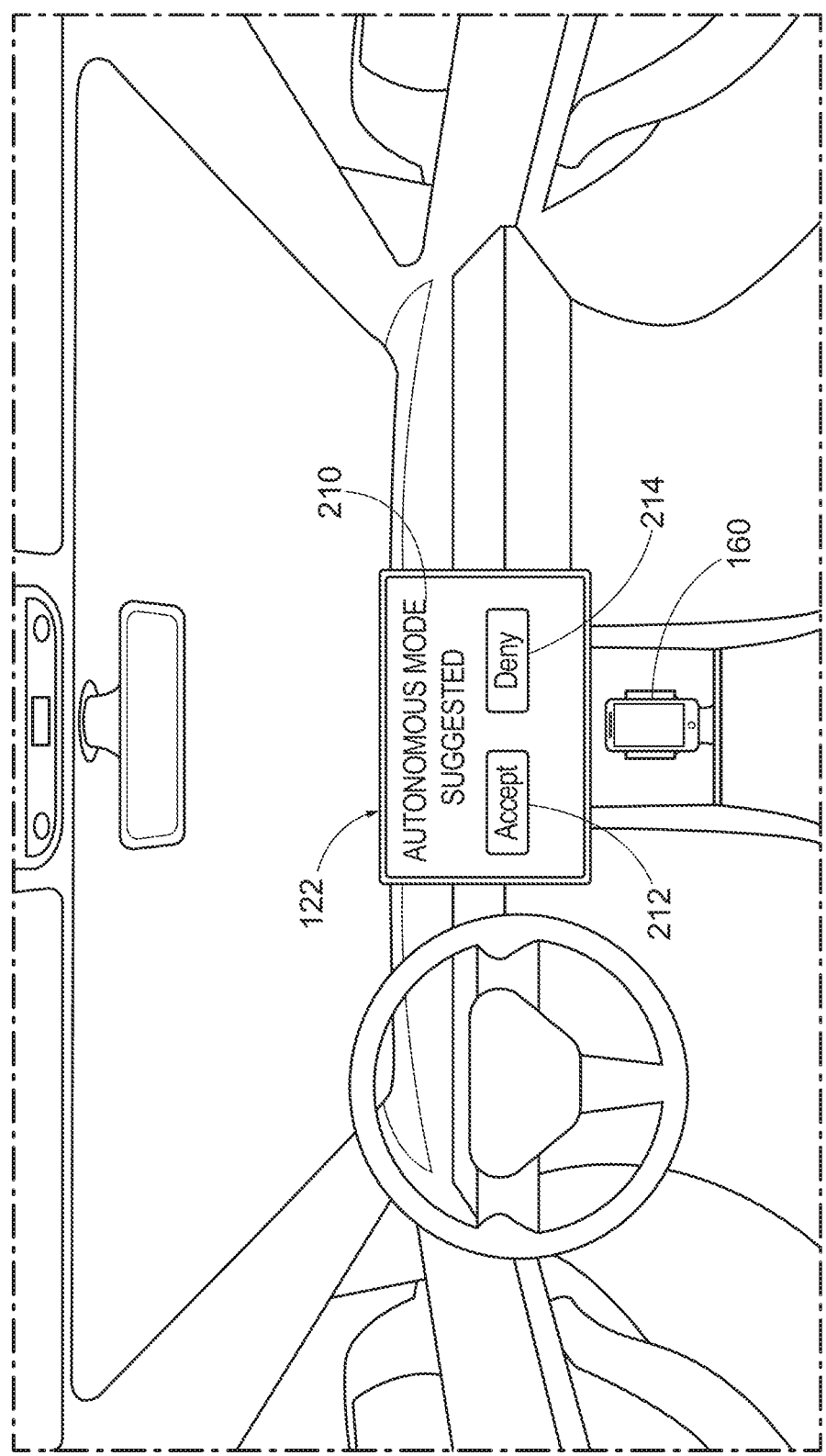
FIG. 2 is an exemplary scenario where the system for driver management of FIG. 1 may be implemented, according to one aspect.

FIG. 2 is an exemplary scenario where the system 100 for driver management of FIG. 1 may be implemented, according to one aspect. In FIG. 2, the display 122 of the vehicle may be used to prompt the user or driver prior to engaging in autonomous operation mode. In other words, in this example, the controller 128 provides the user with an opportunity to be notified and to accept 212 or deny 214 the autonomous driving mode suggestion from the system 100 based on the estimated state of the driver being intoxicated via an interface 210. According to one aspect, the deny 214 option may not be available when the associated confidence level is higher than or greater than the predetermined threshold confidence level. As previously discussed, the GPS 104 of the vehicle or the GPS 164 of the mobile device 160 may provide the state determiner 116 with location information associated with the vehicle or driver, calendar event information may be used to infer the estimated state of the driver, and speech segments from either the mobile device 160 or the microphone of the vehicle, as well.

Figure 3:
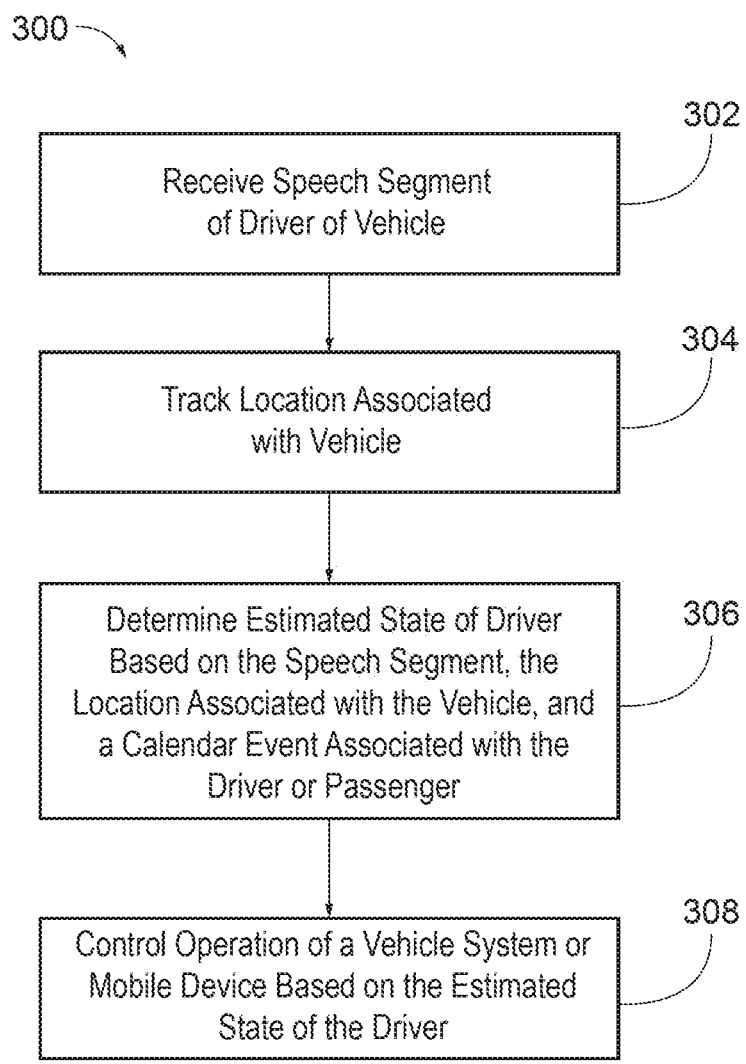
FIG. 3 is a flow diagram of a method for driver management, according to one aspect.

FIG. 3 is a flow diagram of a method 300 for driver management, according to one aspect. The method 300 may include receiving 302 a first speech segment of a driver of an autonomous vehicle at a first time and a second speech segment of the driver of the autonomous vehicle at a second time or merely receiving a speech segment of the driver. The method 300 may include tracking 304 a prior destination, a future destination, a route, a set of waypoints, etc., associated with the driver of the autonomous vehicle. The method 300 may include determining 306 an estimated state of the driver based on the one or more speech segments, the destination(s) or locations associated with the driver of the autonomous vehicle, and a calendar event associated with the driver of the autonomous vehicle, and controlling 308 operation of a vehicle system of the autonomous vehicle or a mobile device 160 based on the estimated state of the driver.

Figure 4:
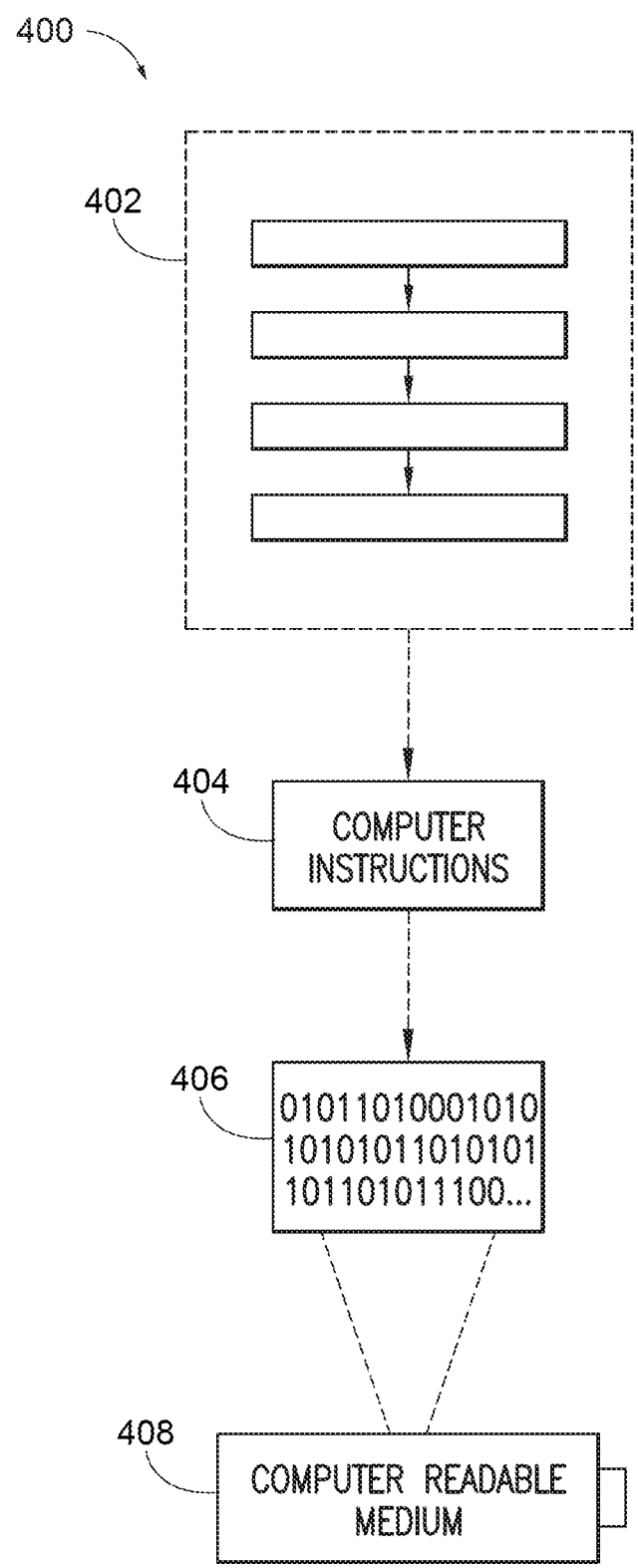
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, among others, on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 3. In another aspect, the processor-executable computer instructions 404 may be configured to implement a system, such as the system 100 or the mobile device 160 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
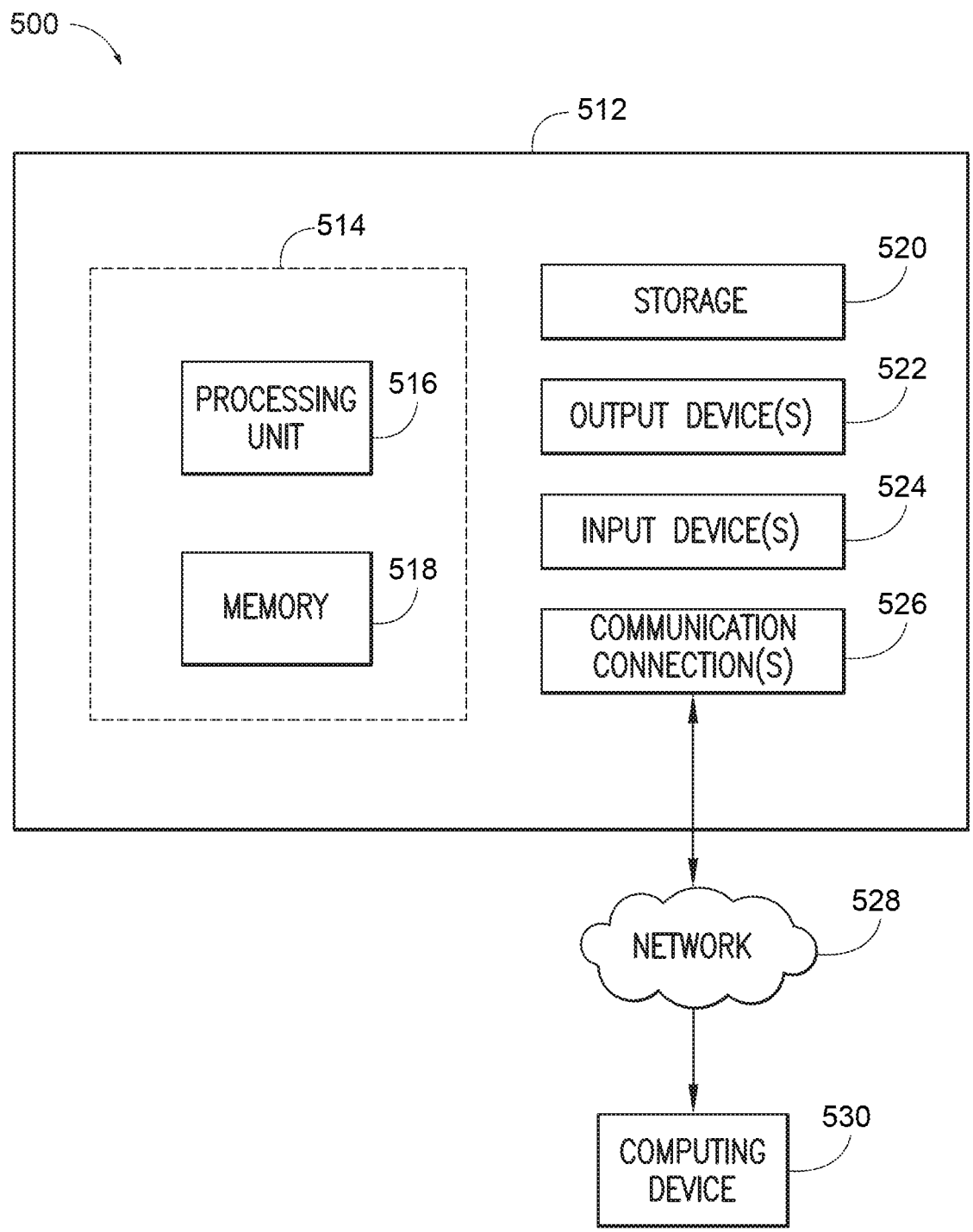
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, or a combination thereof. This configuration is illustrated in FIG. 5 by dashed line 514.

In other aspects, the computing device 512 includes additional features or functionality. For example, the computing device 512 may include additional storage such as removable storage or non-removable storage, including magnetic storage, optical storage, among others. Such additional storage is illustrated in FIG. 5 by storage 520. In one aspect, computer readable instructions to implement one aspect provided herein are in storage 520. Storage 520 may store other computer readable instructions to implement an operating system, an application program, among others. Computer readable instructions may be loaded in memory 518 for execution by processing unit 516, for example.

The term "computer readable media" as used herein includes computer storage media. Computer storage media includes volatile and non-volatile, removable and non-removable media implemented in any method or technology for storage of information such as computer readable instructions or other data. Memory 518 and storage 520 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for driver management, comprising:
a microphone recording a first speech segment of a driver of an autonomous vehicle at a first time and a second speech segment of the driver of the autonomous vehicle at a second time;
a global positioning system (GPS) tracking a position or a destination associated with the driver of the autonomous vehicle, wherein the GPS determines whether the position or the destination associated with the driver of the autonomous vehicle is an establishment which serves alcohol;
a state determiner determining an estimated state of the driver as inebriated or sober based on the first speech segment, the second speech segment, the position or the destination associated with the driver of the autonomous vehicle, whether the establishment serves alcohol, and a context associated with a text description of a future calendar event associated with the driver of the autonomous vehicle including future calendar event metadata; and
a controller enabling an autonomous driving feature of the autonomous vehicle based on the estimated state of the driver.

2. The system for driver management of claim 1, wherein the state determiner compares the first speech segment to the second speech segment by analyzing a difference in a volume, a cadence, a clarity, or a tone from the first speech segment to the second speech segment and determines the estimated state of the driver based on the comparison.

3. The system for driver management of claim 1, wherein the state determiner determines the estimated state of the driver based on a nature of the future calendar event or the text description of the future calendar event.

4. The system for driver management of claim 1, wherein the controller automatically enables autonomous driving based on the estimated state of the driver being inebriated.

5. The system for driver management of claim 1, comprising a transmitter transmitting a warning signal to a mobile device based on the estimated state of the driver.

6. The system for driver management of claim 1, comprising a transmitter transmitting a rideshare signal to a mobile device associated with launching a rideshare application based on the estimated state of the driver.

7. The system for driver management of claim 1, comprising a display displaying a warning notification based on the estimated state of the driver.

8. A method for driver management, comprising:
receiving a first speech segment of a driver of an autonomous vehicle at a first time and a second speech segment of the driver of the autonomous vehicle at a second time;
tracking a prior destination associated with the driver of the autonomous vehicle;
determining whether the prior destination is an establishment which serves alcohol;
determining an estimated state of the driver as inebriated or sober based on the first speech segment, the second speech segment, the prior destination associated with the driver of the autonomous vehicle, whether the prior destination is an establishment which serves alcohol, and a context associated with a text description of a future calendar event associated with the driver of the autonomous vehicle including future calendar event metadata; and
controlling operation of the autonomous vehicle based on the estimated state of the driver.

9. The method for driver management of claim 8, comprising determining the estimated state of the driver based on a nature of the future calendar event or the text description of the future calendar event.

10. The method for driver management of claim 8, wherein the controlling operation of the autonomous vehicle includes enabling or disabling operation of the autonomous vehicle in a manual operation mode.

11. A system for driver management, comprising:
a microphone recording a speech segment of a driver of an autonomous vehicle;
a global positioning system (GPS) tracking a prior destination associated with the autonomous vehicle, wherein the GPS determines whether the prior destination associated with the autonomous vehicle is an establishment which serves alcohol;
a state determiner determining an estimated state of the driver as inebriated or sober based on the speech segment, the prior destination associated with the autonomous vehicle, whether the prior destination is an establishment which serves alcohol, a nature of the future calendar event, and a context associated with a text description of a future calendar event associated with the passenger of the autonomous vehicle including future calendar event metadata; and
a controller controlling operation of the autonomous vehicle based on the estimated state of the driver.

12. The system for driver management of claim 11, wherein the state determiner compares the speech segment to baseline speech segment information by analyzing a difference in a volume, a cadence, a clarity, or a tone from the speech segment to the baseline speech segment information and determines the estimated state of the driver based on the comparison.

* * * * *